Aug. 5, 1952 P. G. GEARING 2,605,814
COMBINATION VEHICLE AND ROCKER FOR CHILDREN
Filed April 21, 1949
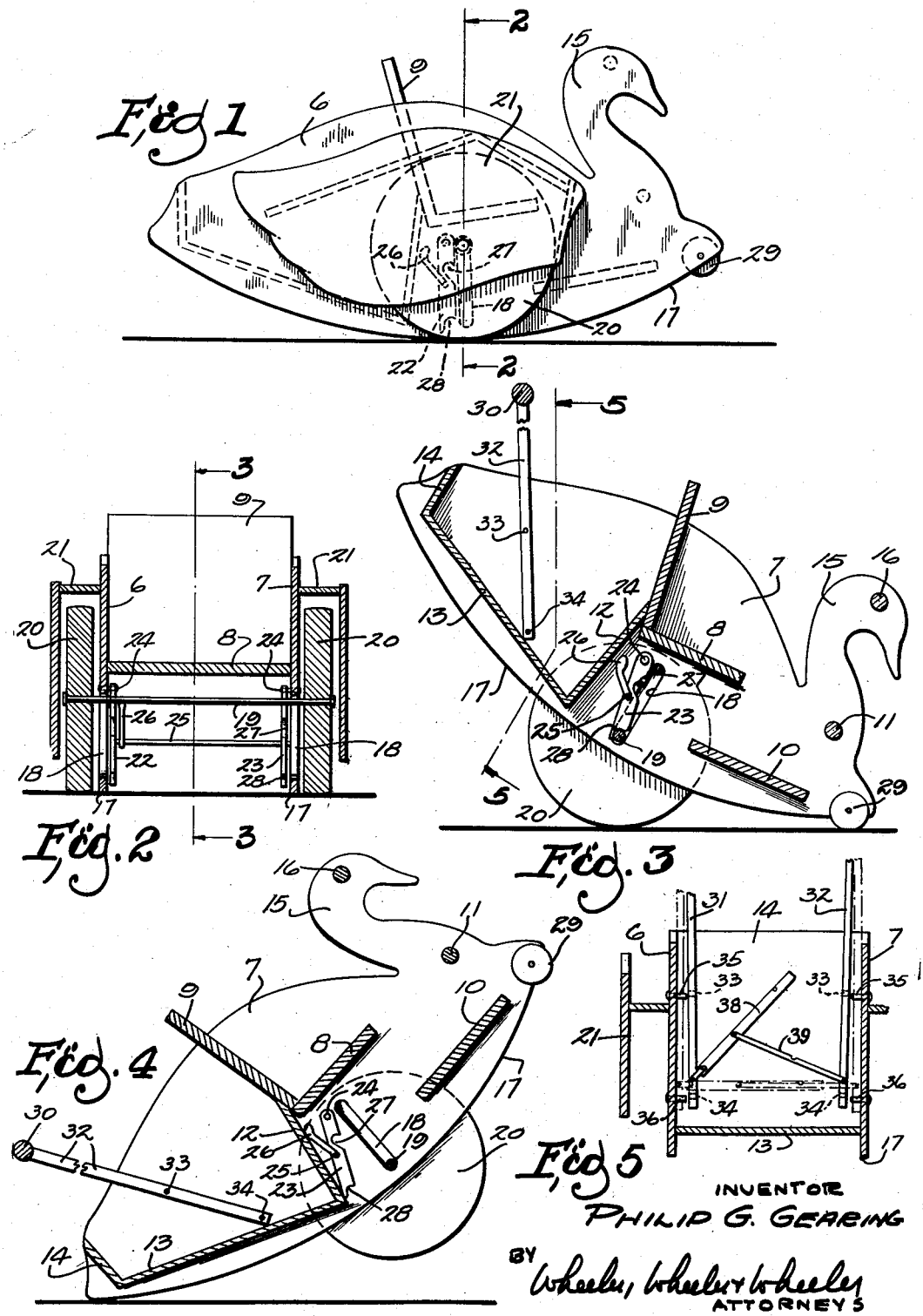
INVENTOR
PHILIP G. GEARING
BY Wheeler, Wheeler & Wheeler
ATTORNEYS Patented Aug. 5, 1952

2,605,814

UNITED STATES PATENT OFFICE 2,605,814

COMBINATION VEHICLE AND ROCKER FOR CHILDREN

Philip G. Gearing, Milwaukee, Wis.

Application April 21, 1949, Serial No. 88,839

4 Claims. (Cl. 155—73)

This invention relates to a combination vehicle and rocker for children.

It is a primary object of the invention to provide a device normally used as a rocker in which wheels are concealed and readily moved to and from retracted positions and one or more positions of use. More specifically, it is an object to provide a construction in which the movement of the wheels can be effected with a minimum of exertion, the locking of the wheels in their several positions being semi-automatic and controlled by the rocking movement of the vehicle body.

It is a further object of the invention to provide a novel and improved handle connection for such a vehicle and to provide a vehicle with ample space not only for a child but for parcels.

In the drawings:

Fig. 1 is a view in side elevation of a device embodying the invention.

Fig. 2 is a view taken from transverse section on the line 2—2 of Fig. 1.

Fig. 3 is a view taken in longitudinal section on the line 3—3 of Fig. 2.

Fig. 4 is a view similar to Fig. 3 showing the parts in a different position of adjustment.

Fig. 5 is a view taken in section on the line 5—5 of Fig. 3.

The body of my combination vehicle and rocker comprises a pair of side panels 6 and 7 which are substantially parallel and connected by the transversely extending seat 8 and the seat back 9. Also spanning the space between the side panels 6 and 7 is the floor-board 10, the strut 11 and the front wall 12, bottom wall 13 and rear wall 14 of the parcel compartment behind the seat. These components may be assembled in any desired manner, as by gluing, and the several members which connect the panels provide a very rigid body structure.

The panels may desirably have a significant contour such as that of a swan, being extended upwardly from strut 11 in simulation of the swan's neck and head at 15. A further strut at 16 provides a handle for a child in the seat.

The respective side panels 6 and 7 have correspondingly curved bottom margins 17 upon which the entire body may oscillate when it is used as a rocker. Substantially at right angles to these margins and immediately beneath the seat, the respective panels have vertical slots at 18 through which extends an axle 19 for the wheels 20. The wheels are at least partially enclosed within the respective wheel housings 21 which are attached to the sides of the respective panels and may desirably have a significant contour complementary to that of the body itself. Where, as in the design illustrated, the body has the contour of a swan, the wheel housings may be shaped to represent the wings of the bird.

Pivoted to each of the panels 6 and 7, preferably interiorly of the body, I provide locking pawls 22, 23 which are oscillatable on the respective pintles 24 and are connected to move in unison by across bar 25. Either on the bar or on one of the pawls, I provide a counterweight 26 for biasing the pawls counterclockwise as viewed in Figs. 1, 3 and 4.

Each pawl is preferably provided with at least two notches 27, 28 selectively engageable with the axle 19.

The length of the axle slots 18, and the dimensions of the respective pawls 22, 23, are such that when the body of the toy rocks forward onto its small front wheels 29 to substantially limit the forward rocking movement, the axle 19 will move by gravity substantially to the bottoms of the respective slots 18. In this position of the parts, the gravity bias of the pawls 22, 23 is such that these will oscillate counterclockwise as shown in Fig. 3 to engage their terminal notches 28 with the axle thereby locking the axle in this position. This constitutes the toy a vehicle movable upon the wheels 20. If the body had been oscillated less far forwardly, the intermediate notches 27 of the respective pawls would be engaged by the axle and the body would be supported at a lesser height, also constituting a vehicle.

With the pawls having either of their notches engaged with the axle, the device may be manipulated by means of the handle hereinafter to be described. However, for restoring the toy for use as a rocker, it is only necessary to rock it sufficiently far back onto its surfaces 17 so that the load is taken off the wheels in the manner indicated in Fig. 4. With the load off the wheels, the axle is free from the notches of the pawls and the pawls will swing clockwise by gravity to the positions indicated in Fig. 4. Thereupon, a forward rocking movement of the toy upon its curved surfaces 17 will force the wheels and axles upwardly, free of the pawls, to the retracted wheel and axle position shown in Fig. 1.

The positions of the body in which the pawls are automatically operated either to or from axle engagement are extreme positions such as are not reached when the body is normally used as a rocker. However, since the body may be manipulated to these positions by means of its propelling handle hereinafter described, the rocking surfaces provide a convenient means upon which the body is manipulated for automatic operation of the detent pawls with little effort on the part of the operator.

For such manipulation, the toy is preferably provided with a detachable handle. There is a handle bar at 30 and parallel legs 31, 32 each apertured at 33 and 34 to receive pins 35, 36 disposed at different levels on the side panels 6 and 7 to project into the luggage compartment above described.

The respective side members or legs 31, 32 of the detachable handle are removed from, or are interlockingly engaged with, the respective pins by a toggle lever system, comprising links 38, 39 pivoted to the respective legs 31, 32 and to each other. With the links 38, 39 in the position shown in full lines in Fig. 5, the free ends of the legs 31, 32 are sprung inwardly to free them from the respective pins but when the links 38, 39 are forced into alignment as shown in dotted lines in Fig. 5, the legs 31 and 32 are spread. If the spreading occurs when the apertures 33, 34 are in registry with the respective pins 35, 36, the handle structure is securely locked to the body and may be used to guide and propel the body and to manipulate it upon its rockers when it is desired to position the wheels for use or to release them for movement to their retracted positions.

The small front wheels 29 are very useful when the device is in use as a go-cart, since they may be engaged with a curbing at the side of a street and used to lift the entire device over the curb. Where the curbing to be encountered is high, the wheels will be fully extended and engaged by the terminal notches of the detent pawls. For ordinary purposes, the wheels will ordinarily be set at the intermediate level.

I claim:

1. A toy of the character described comprising a body having rockers, a wheel supported axle for which said body is provided with guides in which the axle is movable, and a bearing member on the body movable into the path of axle movement to receive support from the axle and in turn support the body, said axle being movable upon said guides to a position in which said wheels are retracted, leaving said body operable upon its rockers, the bearing member comprising a pawl pivotally connected with the body and movable between axle engaging and axle releasing positions according to the tilting of the body upon its rockers toward one extreme rocking position and another.

2. A toy of the character described comprising a body having a seat and side panels provided beneath the seat with upright slots, said body having curvilinear rockers beneath said slots, an axle extending transversely of the body and through the respective slots, wheels on the axle, wheel housings connected with the body and in which the wheels are movable between operative and retracted positions, detent pawls pivotally mounted adjacent the respective panels and notched for engagement with the axle, the notches of the respective pawls being provided to latch the axle in body supporting position, said body being oscillatable upon its said rockers to an extreme position in which the axle is relieved of load, and the said pawls being oscillatable by gravity about their respective mountings to and from axle engagement in said extreme positions.

3. The device of claim 2 in further combination with a detachable handle for the guidance and propulsion of the toy, said body having spaced pins, and said handle comprising relatively movable leg portions having apertures engageable with said pins, and a collapsible strut extending between said legs and holding them engaged with the respective pins.

4. The device of claim 2 in further combination with a detachable handle for the guidance and propulsion of the toy, said body having spaced pins, and said handle comprising relatively movable leg portions having apertures engageable with said pins, and a collapsible strut extending between said legs and holding them engaged with the respective pins, the said collapsible strut comprising toggle links pivotally connected with said legs and to each other.

PHILIP G. GEARING.

REFERENCES CITED

The following references are of record in the file of this patent:

UNITED STATES PATENTS

| Number | Name | Date |
|---|---|---|
| 756,419 | Shoemaker | Apr. 5, 1904 |
| 1,364,684 | Beck | Jan. 4, 1921 |
| 1,952,467 | Slee | Mar. 27, 1934 |
| 2,028,128 | Braasch | Jan. 21, 1936 |
| 2,061,527 | Sweet | Nov. 17, 1936 |
| 2,414,214 | Spackman | Jan. 14, 1947 |